June 13, 1961 K. H. SCHMIDT 2,988,708

TRANSISTOR RELAXATION OSCILLATOR

Filed July 10, 1957

INVENTOR

Kenneth H. Schmidt,

BY John B. Brady

ATTORNEY

United States Patent Office 2,988,708
Patented June 13, 1961

2,988,708
TRANSISTOR RELAXATION OSCILLATOR
Kenneth H. Schmidt, Danbury, Conn., assignor to Mosler Research Products, Inc., Danbury, Conn., a corporation of Delaware
Filed July 10, 1957, Ser. No. 670,971
5 Claims. (Cl. 331—111)

My invention relates broadly to transistor circuits and more particularly to a transistor relaxation oscillator for controlling a load circuit.

One of the objects of my invention is to provide a transistor relaxation oscillator circuit adapted to supply oscillations to a load circuit in timed sequence for correspondingly controlling the load.

Another object of my invention is to provide an arrangement of transistor relaxation oscillator comprising complementary transistors, that is a PNP transistor operative with negative voltage applied and an NPN transistor operative with positive voltage applied, and powered from the same source for impressing timed oscillations upon a load.

Another object of my invention is to provide a transistor controlled alarm circuit eliminating all contactor make and break devices normally required in operating an alarm.

Other and further objects of my invention reside in an arrangement of feedback circuit utilizing complementary transistors coacting as a relaxation oscillator powered from one battery potential as set forth more fully in the specification hereinafter following by reference to the accompanying drawings, in which.

Figures 1, 2, 3, 4:
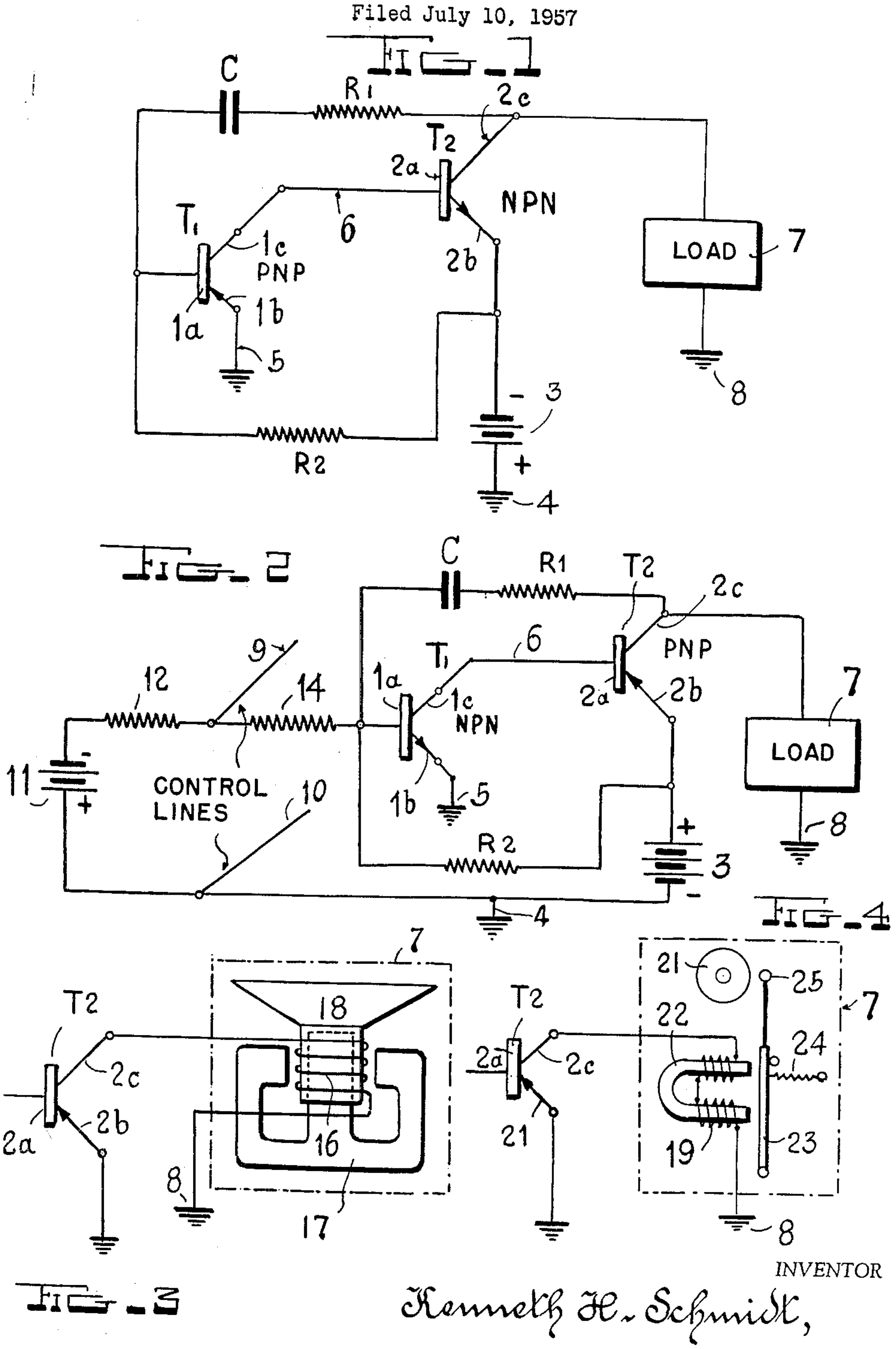
FIG. 1 is a circuit diagram schematically showing the transistor relaxation oscillator of my invention.
FIG. 2 shows the transistor relaxation oscillator of my invention arranged for operation from control lines for operating a load relative to the oscillations established by the transistor relaxation oscillator.

FIG. 3 is a schematic circuit diagram of the output portion of the relaxation oscillator circuit showing the manner of controlling the voice coil of a loudspeaker for sounding an alarm; and FIG. 4 is a view similar to the view shown in FIG. 3 but illustrating the application of the output of the relaxation circuit oscillator for controlling a bell or buzzer with the normal make and break contacts thereof entirely eliminated.

My invention is directed to a circuit arrangement for a transistor relaxation oscillator in which two complementary transistors, that is, a PNP transistor operative with negative voltage applied and an NPN transistor operative with positive voltage applied coact in a positive feedback circuit to establish oscillations from the same battery potential. The magnitude and phase of the feedback are controlled by a condenser and resistor arranged in a series circuit with a supplemental resistor circuit. The transistors may be interchanged by reversing the battery potential. Oscillations are applied to a load at a controlled frequency at such periodicity as permits the direct operation of a voice coil of a loudspeaker or the magnet winding of a bell or buzzer. The normal make and break contacts of the bell or buzzer are wholly eliminated. The frequency of the relaxation oscillator is adjusted by controlling the values of the condenser and resistor and the value of the supplemental resistor. The operation of the sound operated device is governed by current supplied to the transistor relaxation oscillator circuit over control lines by which current of the same polarity to the oscillator battery may be impressed upon the base of one of the transistors through the control lines. This cuts off the oscillator and silences the bell or buzzer. The alarm is given by interrupting this current. The control lines are protected from cutting or shorting for either will interrupt this current. As soon as the current in the control line is interrupted to the base of the said transistor or supplied at positive polarity to the base, since the base is normally biased negatively for suppressing oscillations, oscillations are established through the relaxation oscillator circuit that operates the bell or buzzer.

Referring to the drawings in more detail, reference character $T_1$ designates a PNP transistor operating with negative voltage applied while reference character $T_2$ designates an NPN transistor operating with positive voltage applied. The base 1*a* of transistor $T_1$ is connected through resistor $R_2$ with the negative side of the battery 3, the positive side of which is grounded as indicated at 4. The emitter 1*b* of transistor $T_1$ is grounded as represented at 5. The collector 1*c* of transistor $T_1$ is connected through lead 6 with the base 2*a* of transistor $T_2$, the emitter 2*b* of which connects to the negative side of battery 3. A series circuit containing condenser C and resistor $R_1$ is connected between the base 1*a* of transistor $T_1$ and the collector 2*c* of transistor $T_2$, as shown. The output of the relaxation circuit oscillator connects to one side of the load 7, the other side of which connects to ground as shown at 8. Feedback from output to input through condenser C and resistor $R_1$ in series maintains oscillations.

In FIG. 2 I have shown one of the applications of my invention to an electrical system involving control lines 9 and 10 over which polarity signal current is transmitted. In this arrangement the control lines 9 and 10 normally supply current of polarity opposite to the polarity of oscillator battery 11 to the base 1*a* of transistor $T_1$. That is, oscillator battery 11 has its negative terminal connected through resistor 12 to control line 9 and through resistor 14 to the base 1*a* of transistor $T_1$. Control line 10 connects to the circuit leading to the positive side of oscillator battery 11. Feedback from the output to the input through condenser C and resistor $R_1$ in series maintains oscillations. The values of condenser C and resistor $R_1$ and the value of resistor $R_2$ affect the magnitude and phase of the feedback and thus the frequency of oscillations. As shown, the transistors $T_1$ and $T_2$ may be interchanged by reversing polarity of battery 3. In the arrangement shown in FIG. 2 the battery 3 has its positive terminal connected with the emitter 2*b* of transistor $T_2$ and its negative terminal connected to ground as indicated at 4.

In operation, referring to FIGURE 1, the condenser C initially charges from the negative terminal of the power source 3 through the emitter-collector circuit 2*b*, 2*c* of the NPN transistor $T_2$, resistor R, and base-emitter circuit 1*a*, 1*b* of PNP transistor $T_1$ back to the common ground connection or positive terminal 4 of the power source, whereby a positive polarity appears across the condenser C and is applied to the base 1*a* of PNP transistor $T_1$. As a result, when the condenser is fully charged, the transistor $T_1$ is biased to cut-off by the positive base potential and acts to cut off the NPN transistor $T_2$ by virtue of the now open circuit condition of the emitter-collector circuit 1*b*, 1*c* of the PNP transistor $T_1$.

Upon cut-off of the transistors the only discharge path open to the condenser C is through resistor $R_2$, battery 3, load 7 and resistor $R_1$. As soon as the discharge current through $R_2$ has dropped to a level such that a negative potential may again be applied to the base 1a of the PNP transistor $T_1$ then both of the transistors will be switched on allowing both emitter-collector circuits to close and complete the charging circuit for the condenser C.

The frequency of oscillation of the relaxation oscillator may be varied by setting resistor $R_1$ to the desired charging rate of the condenser C and subsequently adjusting resistor $R_2$ for the desired discharge rate whereby the period of the complete cycle of operation is determined. The condenser charging rate is therefore a function of the time constant of the series combination of the condenser C and the resistor $R_1$ while the discharge rate is a function of the time constant of the combined condenser C, resistors $R_1$ and $R_2$ and load impedance 7.

Referring to FIGURE 2, the transistors have been reversed in polarity from FIGURE 1 with the polarity of the power source reversed to compensate for this change. Battery 11 and battery 3 are representative of two opposed polarity sources of power connected by resistors 12 and 14, and $R_2$, respectively, between the base terminal 1a of the NPN transistor $T_1$ and a common ground connection 4.

As long as control lines 9 and 10 are open circuited as shown in FIGURE 2, the negative potential of battery 11 is of such magnitude as to algebraically nullify the positive potential of the battery 3 such that the polarity of the base 1a is no longer positive with respect to ground. Therefore, until the lines 9 and 10 are short circuited in response to some predetermined condition, no charging current will flow to condenser C and no subsequent oscillations will be generated at the load 7. As shown in FIGURES 3 and 4, the load 7 may be a loudspeaker, buzzer, or the like.

The load 6 may be resistive or inductive. As shown in FIG. 3 the load comprises the voice coils 16 of a loudspeaker having magnets 17 operating a sound reproducing diaphragm 18.

In FIG. 4 the load comprises the windings 19 of a bell or buzzer 21, the windings being arranged on magnet core 22 for operating a vibratory armature 23 spring biased at 24, and operating the clapper 25 for sounding the bell 21 where the alarm is a bell as distinguished from a buzzer. The normal make and break contacts of the bell are eliminated. The frequency of the relaxation oscillator circuit is adjusted by selecting the values of resistor $R_1$ and condenser C and resistor $R_2$, so that the bell can respond. The backfeed from the output to the input through condenser C and resistor $R_1$ in series maintains oscillations and accordingly operates the alarm either in the form shown in FIG. 3, or the form shown in FIG. 4, producing an audible warning. However, when current of opposite polarity to the oscillator battery 11 is supplied through the control lines 9 and 10 to the base 1a of transistor $T_1$ the oscillations are cut off and this silences the bell. When the polarity signal current is interrupted in control lines 9 and 10 the battery polarity 11 again predominates and the oscillations are resumed and maintained, thus sounding the alarm. Thus, the alarm may be sounded without the use of relays or contactors of any kind, thereby greatly simplifying the system. The control lines 9 and 10 are protected from cutting or shorting for either will interrupt this current.

My invention has numerous applications, one of which is the Electromagnetic Security Alarm System of my copending application Serial Number 225,993, filed May 12, 1951, now Patent No. 2,693,211, in which capacity unbalance of control lines serves to operate an alarm which by my present invention is accomplished without the use of relays and the make and break contacts thereof.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A relaxation oscillator circuit comprising a PNP transistor and an NPN transistor, each having a base, an emitter, and a collector, a series circuit forming a feedback path containing a condenser and a resistor connected between the base of said PNP transistor and the collector of said NPN transistor, a short circuit connection from the base of said NPN transistor to the collector of the PNP transistor, a power source having its negative terminal connected with the base of said PNP transistor through a resistor and its positive terminal connected with the emitter of said PNP transistor, a connection from said negative terminal to the emitter of said NPN transistor, a load, and a connection from the positive terminal of said source to one side of said load and from the collector of said NPN transistor to the other side of said load, said connections establishing a circuit for sustaining oscillations.

2. A relaxation oscillator circuit comprising an NPN transistor and a PNP transistor, each having a base, an emitter, and a collector, a series circuit forming a feedback path containing a condenser and a resistor connected between the base of said NPN transistor and the collector of said PNP transistor, a power source having its positive terminal connected with the base of said NPN transistor through a resistor and its negative terminal connected with the emitter of said NPN transistor, a connection from said positive terminal to the emitter of said PNP transistor, a load, a second power source, a connection between the negative side of said second source and the base of said NPN transistor and the emitter of said PNP transistor, and a connection from the positive side of said last mentioned source with the collector of said PNP transistor through said load.

3. A relaxation oscillator circuit comprising an NPN transistor and a PNP transistor, each having a base, an emitter, and a collector, a series circuit forming a feedback path containing a condenser and a resistor connected between the base of said NPN transistor and the collector of said PNP transistor, a power source having its positive terminal connected with the base of said NPN transistor through a resistor and its negative terminal connected with the emitter of said NPN transistor, a connection from said positive terminal to the emitter of said PNP transistor, a load, a second power source, a connection between the negative side of said second source and the base of said NPN transistor and the emitter of said PNP transistor, a connection from the positive side of said last mentioned power source with the collector of said PNP transistor through said load, and polarity signal control lines connected with the base and emitter of said NPN transistor for biasing said transistor to a condition suppressing oscillations in said circuit when said control lines are in an open circuit condition and for removing said bias from the base of said NPN transistor when said control lines are in a short-circuit condition whereby said relaxation oscillator circuit will be energized.

4. A relaxation oscillator circuit as set forth in claim 3 in which said first and second power sources are connected across said base to emitter circuit of said NPN transistor in opposed polarity such that the algebraic sum of the potentials of said power sources at the base of said NPN transistor with respect to the emitter thereof is sufficiently negative with respect to the positive base cut-off potential of said NPN transistor to suppress oscillations in said circuit during an open circuit condition of said control lines.

5. A relaxation oscillator circuit as set forth in claim 3 in which a resistor is interposed between one of said polarity signal control lines and the base of said NPN transistor and wherein another resistor is interposed between said one of said control lines and the negative side of said last mentioned power source.

References Cited in the file of this patent

UNITED STATES PATENTS 2,576,585 Fleming ---------------- Nov. 27, 1951

2,788,449 Bright ------------------- Apr. 9, 1957
2,812,437 Sziklai ------------------ Nov. 5, 1957

OTHER REFERENCES

"Oscillators," by Louis, in Radio and Television News, pages 105 to 107, July 1956.